(12) United States Patent
Bélanger et al.

(10) Patent No.: US 12,330,319 B2
(45) Date of Patent: Jun. 17, 2025

(54) ROBOTIC SYSTEMS AND METHODS FOR ASSEMBLING FURNITURE

(71) Applicant: MIRALIS INC., Saint-Anaclet-de-Lessard (CA)

(72) Inventors: Langis Bélanger, Saint-Anaclet-de-Lessard (CA); Jean-Philippe Collin, Saint-Anaclet-de-Lessard (CA)

(73) Assignee: MIRALIS INC., Saint-Anaclet-de-Lessard (CA)

( * ) Notice: Subject to any disclaimer, the term of this patent is extended or adjusted under 35 U.S.C. 154(b) by 605 days.

(21) Appl. No.: 17/429,053

(22) PCT Filed: Feb. 7, 2020

(86) PCT No.: PCT/CA2020/050163
§ 371 (c)(1),
(2) Date: Aug. 6, 2021

(87) PCT Pub. No.: WO2020/160675
PCT Pub. Date: Aug. 13, 2020

(65) Prior Publication Data
US 2022/0126455 A1 Apr. 28, 2022

Related U.S. Application Data (60) Provisional application No. 62/802,876, filed on Feb. 8, 2019.

(51) Int. Cl.
*B25J 9/16* (2006.01)
*B25J 11/00* (2006.01)
*B25J 15/00* (2006.01)

(52) U.S. Cl.
CPC .......... *B25J 9/1697* (2013.01); *B25J 11/005* (2013.01); *B25J 15/0052* (2013.01)

(58) Field of Classification Search
CPC .... B25J 9/1697; B25J 11/005; B25J 15/0052; B25J 9/1669
(Continued)

(56) References Cited

U.S. PATENT DOCUMENTS 4,613,942 A * 9/1986 Chen ................ G06T 1/0014
235/494
4,785,528 A * 11/1988 Soderberg ............ B25J 19/0012
414/744.8
(Continued)

FOREIGN PATENT DOCUMENTS

| CN | 203266854 | 11/2013 |
|---|---|---|
| CN | 104816360 | 8/2015 |

(Continued)

OTHER PUBLICATIONS

Ross A. Knepper, IkeaBot: An Autonomous Multi-Robot Coordinated Furniture Assembly System, published May 2013, pp. 855-862.*

(Continued)

*Primary Examiner* — Manglesh M Patel
(74) *Attorney, Agent, or Firm* — SMART & BIGGAR LP (57) ABSTRACT

Systems, devices and methods are directed to robotic assembly of a piece of furniture. The systems include a robot including a base, a robotic arm coupled to the base and a multi-functional robotic head coupled to the robotic arm. The multi-functional robotic head includes a camera configured to scan a barcode positioned on a part presented to the robot. The barcode provides instructions to the robot for attaching one or more hardware components to the part to assemble the piece of furniture. The multi-functional robotic head also includes a first applicator mechanism configured to apply an adhesive to the part; a first gripping mechanism configured to grip a first hardware component to be maneuvered by the robotic arm to a first position to be attached to (Continued)

the part, and a first attachment mechanism configured to attach the first hardware component to the part at the first position.

17 Claims, 8 Drawing Sheets

(58) Field of Classification Search
USPC .......................... 700/259, 95, 262, 245, 221
See application file for complete search history.

(56) References Cited

U.S. PATENT DOCUMENTS

| | | | | |
|---|---|---|---|---|
| 4,872,257 | A * | 10/1989 | Wakamori | G05B 19/4182 29/714 |
| 5,148,591 | A * | 9/1992 | Pryor | G05B 19/39 29/407.04 |
| 5,237,468 | A * | 8/1993 | Ellis | B25J 5/02 360/92.1 |
| 5,319,845 | A * | 6/1994 | Watanabe | B23P 21/004 29/784 |
| 5,602,967 | A * | 2/1997 | Pryor | G01B 11/00 700/254 |
| 5,961,722 | A * | 10/1999 | Buhrer | H01L 21/68 414/217 |
| 5,987,217 | A * | 11/1999 | Wisniewski | B27M 1/003 409/206 |
| 6,163,946 | A * | 12/2000 | Pryor | B25J 9/1697 29/702 |
| 7,661,181 | B1 | 2/2010 | Whitfield | |
| 8,855,810 | B2 * | 10/2014 | Chuah | B25J 9/1697 414/730 |
| 9,346,185 | B2 | 5/2016 | Liang et al. | |
| 9,514,434 | B2 | 12/2016 | Krauter et al. | |
| 9,649,790 | B2 * | 5/2017 | Shinozaki | B29C 41/02 |
| 9,895,775 | B2 | 2/2018 | Koscielski et al. | |
| 10,210,603 | B2 * | 2/2019 | Venable | H04N 23/698 |
| 10,232,899 | B1 * | 3/2019 | Gatta | B65G 37/00 |
| 10,453,153 | B2 | 10/2019 | Heape | |
| 2002/0105296 | A1 * | 8/2002 | Okuyama | B25J 9/1669 318/568.16 |
| 2011/0087360 | A1 * | 4/2011 | Chen | B25J 9/1697 700/114 |
| 2012/0230668 | A1 * | 9/2012 | Vogt | H04N 23/50 396/428 |
| 2014/0253720 | A1 * | 9/2014 | Li | G05B 19/402 348/95 |
| 2015/0100162 | A1 * | 4/2015 | Lin | B25J 9/0093 700/259 |
| 2015/0170365 | A1 * | 6/2015 | Liu | G06T 7/80 382/103 |
| 2015/0243019 | A1 * | 8/2015 | Hall | B62M 9/128 382/141 |
| 2016/0129594 | A1 | 5/2016 | Telling | |
| 2017/0326818 | A1 | 11/2017 | Candia Cordeiro et al. | |
| 2018/0350011 | A1 | 12/2018 | Heape | |
| 2018/0374239 | A1 * | 12/2018 | Wallack | H04N 23/90 |
| 2020/0070909 | A1 * | 3/2020 | Stadler | B65G 35/06 |
| 2020/0324974 | A1 * | 10/2020 | Gorman | G06Q 10/087 |
| 2021/0362352 | A1 * | 11/2021 | Wang | B25J 9/1612 |
| 2022/0398707 | A1 * | 12/2022 | Choi | B25J 9/1679 |
| 2023/0121498 | A1 * | 4/2023 | Hashiguchi | G05B 17/02 700/245 |
| 2023/0173660 | A1 * | 6/2023 | Wang | G06V 40/28 700/262 |
| 2023/0243759 | A1 * | 8/2023 | Arboleda | B25J 9/1697 702/82 |
| 2024/0109190 | A1 * | 4/2024 | Nakamura | B25J 9/163 |

FOREIGN PATENT DOCUMENTS

| | | |
|---|---|---|
| CN | 204687007 | 10/2015 |
| CN | 106926340 | 7/2017 |
| CN | 107048823 | 8/2017 |
| CN | 206598179 | 10/2017 |
| CN | 108144863 | 6/2018 |
| CN | 108170100 | 6/2018 |
| CN | 207523327 | 6/2018 |
| DE | 102004036593 | 2/2006 |
| DE | 202005020526 | 3/2006 |
| EP | 0178727 | 4/1986 |
| EP | 2100705 | 9/2009 |
| KR | 20130117320 | 10/2013 |
| KR | 20170114206 | 10/2017 |
| WO | 9829224 | 7/1998 |
| WO | 2008012674 | 1/2008 |
| WO | 2012104100 | 8/2012 |

OTHER PUBLICATIONS

Mingxin Yu et al., RoboAssembly: Learning Generalizable Furniture Assembly Policy in a Novel Multi-robot Contact-rich Simulation Environment, published Dec. 2021 arXiv, pp. 1-8 (pdf).*
Minho Heo et al., FurnitureBench: Reproducible Real-World Benchmark for Long-Horizon Complex Manipulation, Jul. 14, 2023, Robotics: Science and Systems, pp. 1-35 (pdf).*
Hiroyki Kobayashi, A new proposal for self-localization of mobile robot by self-contained 2D barcode landmark, 2012, IEEE, pp. 2080-2083.*
Jong Hwan Beck et al., Vision based Distance Measurement System using Two-dimensional Barcode for Mobile Robot, 2017, IEEE, pp. 1-4 (pdf).*
English Translation—Machine Translation of CN104816360B, "Laminated wood automatic squaring system and method", published on Mar. 1, 2017.
English Translation—Machine Translation of CN107048823A, Production method of massage sofa with internal power line carrier communication module, published on Aug. 18, 2017.
English Translation—Machine Translation of CN108144863A, "Optimal manufacturing method and system for lean production in panel production in furniture industry", published on Jun. 12, 2018.
English Translation—Machine Translation of CN108170100A, "Intelligent manufacture platform of customized plate furniture", published on Jun. 15, 2018.
English Translation—Machine Translation of CN203266854U, "Automatic Assembly Line for Upholstered Furniture", published on Nov. 6, 2013.
English Translation—Machine Translation of CN204687007U, "Integrated automatic side of piecing together of material system", published on Oct. 7, 2015.
English Translation—Machine Translation of CN206598179U, "Online screen storage device comprises a base", published on Oct. 31, 2017.
English Translation—Machine Translation of CN207523327U, "A Cnc engraver constructs with putting trigger for processing furniture", published on Jun. 22, 2018.
English Translation—Machine Translation of DE102004036593A1, "Furniture manufacturing machining and assembling method is controlled by computer to alter various parts for individual orders", published on Feb. 9, 2006.
English Translation—Machine Translation of DE202005020526U1, "Furniture manufacturing machining and assembling method is controlled by computer to alter various parts for individual orders", published on Feb. 9, 2006.
English Translation—Machine Translation of EP2100705A1, "Device for Setting Fittings and Gluing Items of Furniture", published on Sep. 16, 2009.
English Translation—Machine Translation of KR20130117320A, "Furniture Manufacture Equipment", published on Oct. 25, 2013.
English Translation—Machine Translation of KR20170114206A, "Automation system for manufacturing furniture material", published on Oct. 13, 2017.
English Translation—Machine Translation of WO9829224A1, "Process and Device for Manufacturing Pieces of Furniture", published Jul. 9, 1998.

(56) References Cited

OTHER PUBLICATIONS

English Translation—Machine Translation of WO2012104100A1, "Method and Device for Equipping a Multi-Layer Solid Wood Composite Component", published on Aug. 9, 2012.
Homag, "Robot management FEEDBOT on CNC processing centers", [online], [retrieved on Aug. 5, 2021]. Retrieved from the Internet <URL:https://www.homag.com/en/product-detail/robot-management-feedbot-on-cnc-processing-centers/>.
Evan Ackerman, "Robots Continue Attempting to Master Ikea Furniture Assembly", [online], [retrieved on Aug. 5, 2021]. Retrieved from the Internet <URL:https://spectrum.iee.org/automaton/robotics/industrial-robots/robots-continue-attempting-to-master-ikea-furniture-assembly>.
Lin et al., "A virtual factory based approach to on-line simulation and scheduling for an FMS and a case study", Journal of Intelligent Manufacturing 12, 269-279, 2001. (The year of publication is sufficiently earlier than the effective U.S. filing date so that the particular month of publication is not an issue).
Alstons Cabinet LTD, "Alstons Lot 7 Robot Drawer Assembly Cell", Dec. 3, 2018.
Nobilia, "Nobilia Kitchen Design & Manufacturing—German Kitchen Engineering", Dec. 3, 2018.
Veer Surendra Sai University of Technology, "Automation & Numeric Control Machines", Dec. 3, 2018.

\* cited by examiner

ROBOTIC SYSTEMS AND METHODS FOR ASSEMBLING FURNITURE

CROSS-REFERENCE TO RELATED APPLICATIONS

The present application is a 35 USC 371 national stage entry of PCT/CA2020/050163 filed on Feb. 7, 2020 and which claims priority to U.S. provisional application No. 62/802,876 filed on Feb. 8, 2019. These documents are hereby incorporated by reference in their entirety.

TECHNICAL FIELD

The embodiments disclosed herein relate to systems, devices and methods for assembling furniture, and more specifically, to robotic systems, devices and methods for assembling furniture.

BACKGROUND

Assembling pieces of furniture such as tables, chairs, desks, shelving, and cabinets can be onerous for individuals because assembly generally requires attaching a variety of hardware components to a base material in very precise locations.

For instance, when assembling shelving, attaching hardware components such as hinge mounting plates and drawer slides to base materials can be very difficult because the operability of associated doors or drawers can be negatively impacted if the hardware components are attached to the base material at incorrect locations.

Robots offer the potential to replace individuals in assembling furniture. Robots are generally more precise than individuals are when performing operations that require repeatedly measuring same positions on a series of identical base materials and attaching same components to the base materials at the same positions. However, there has been difficulty in designing and programming robots that can function efficiently when there is a slight variability in the measured positions and/or hardware components used in the operations that it repeatedly performs.

SUMMARY

Systems and methods for assembling furniture are described herein.

According to one aspect, a robot for assembling a piece of furniture is provided. The robot comprises:
  a base;
  a robotic arm coupled to the base at a first end of the robotic arm;
  a multi-functional robotic head coupled to the robotic arm at a second end of the robotic arm, the multi-functional robotic head comprising:
    a camera configured to scan a barcode positioned on a part presented to the robot, the barcode providing instructions to the robot for attaching one or more hardware components to the part to assemble the piece of furniture;
    a first applicator mechanism configured to apply an adhesive to the part;
    a first gripping mechanism configured to grip a first hardware component, the first hardware component being manoeuvred by the robotic arm to a first position to be attached to the part;
    a first attachment mechanism configured to attach the first hardware component to the part at the first position via a fastener to assemble the piece of furniture; and
  a computing unit in communication with the robotic arm and the multi-functional robotic head, the computing unit configured to receive the instructions from the camera and to control the robotic arm and the multi-functional robotic head to assemble the piece of furniture.

According to another aspect, a method of assembling a piece of furniture with a robot is provided. The method comprises:
  scanning a barcode on a part by the robot, the barcode providing instructions to the robot for attaching one or more hardware components to the part to assemble the piece of furniture;
  selecting a first hardware component to attach to the part by the robot, the first hardware component selected based on the instructions provided to the robot;
  manoeuvring the first hardware component to a first position of the part to be attached to the part, the first position of the part determined by the robot based on the instructions provided to the robot; and
  attaching the first hardware component to the part by the robot to assemble the piece of furniture.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various systems and methods are described below to provide an example of at least one embodiment of the claimed subject matter. No embodiment described below limits any claimed subject matter and any claimed subject matter may cover systems and methods that differ from those described below. The claimed subject matter are not limited to systems and methods having all of the features of any one system and method described below or to features common to multiple or all of the systems and methods described below. Subject matter that may be claimed may reside in any combination or sub-combination of the elements or process steps disclosed in any part of this document including its claims and figures. Accordingly, it will be appreciated by a person skilled in the art that a system or method disclosed in accordance with the teachings herein may embody any one or more of the features contained herein and that the features may be used in any particular combination or sub-combination that is physically feasible and realizable for its intended purpose.

Furthermore, it is possible that a system or method described below is not an embodiment of any claimed subject matter. Any subject matter that is disclosed in a system or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the result is not significantly changed. These terms of degree should be construed as including a deviation of the modified term, such as 1%, 2%, 5%, or 10%, for example, if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should be noted that the term "coupled" used herein indicates that two elements can be directly coupled to one another or coupled to one another through one or more intermediate elements.

It should also be noted that, as used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

Robotic systems, devices and methods for assembling furniture are provided herein. The systems and methods utilize a robot generally operated without direct interaction by an operator.

Herein, it should be noted that the term "furniture" refers to movable articles, such as but not limited to tables, chairs, desks, shelving, or cabinets, for use or ornament in a house, office, or the like.

According to some embodiments, the camera is further configured to scan the part to determine dimensions of the part.

According to some embodiments, the instructions provided by the barcode include co-ordinates on the part for applying the adhesive or attaching the first hardware component.

According to some embodiments, the processor is configured to determine a position on the part to apply the adhesive based on the instructions provided by the barcode.

According to some embodiments, the processor is configured to determine the position on the part to attach the first hardware component based on the instructions provided by the barcode.

According to some embodiments, the gripping mechanism is a pair of parallel plates.

According to some embodiments, the first hardware component is a hinge mounting plate.

According to some embodiments, the processor is further configured to direct the robotic arm to pick up the hinge mounting plates from a hardware provider.

According to some embodiments, the multi-functional robotic head further comprises a second gripping mechanism configured to grip a second hardware component.

According to some embodiments, the second hardware component is one or a slide and a slide spacer.

According to some embodiments, the processor is further configured to direct the robotic arm to pick up the hinge mounting plates from a hardware provider.

According to some embodiments, the multi-functional robotic head further comprises a second applicator mechanism configured to apply a third hardware component.

According to some embodiments, the third hardware component is an adjustable shelf bracket.

According to some embodiments, the robot further comprises a storage device for storing the adjustable shelf brackets, the adjustable shelf brackets provided to the storage device by a vibratory bowl feeder.

According to some embodiments, the attachment mechanism is a screwdriver.

According to some embodiments, after scanning the barcode on the part by the robot, scanning the part to determine dimensions of the part by the robot.

According to some embodiments, scanning the barcode on the part by the robot includes scanning the barcode on the part by a camera of a multi-functional robotic head of the robot.

According to some embodiments, after scanning the barcode on the part, applying an adhesive to the part at an adhesive position.

According to some embodiments, selecting the first hardware component to attach to the part by the robot includes selecting a hinge mounting plate to attach to the part by the robot.

According to some embodiments, selecting the hinge mounting plate to attach to the part by the robot includes manoeuvring a multi-functional robotic head of the robot to a first storage location and gripping the hinge mounting plate by the first gripper of the multi-functional robotic head of the robot.

According to some embodiments, after attaching the first hardware component to the part by the robot, selecting a second hardware component to attach to the part.

According to some embodiments, selecting the second hardware component to attach to the part by the robot includes selecting a slide and a slide spacer to attach to the part by the robot.

According to some embodiments, selecting the slide and slide spacer to attach to the part by the robot includes manoeuvring a multi-functional robotic head of the robot to a second storage location and gripping the slide and a slide spacer by the second gripper of the multi-functional robotic head of the robot.

According to some embodiments, the method further comprises manoeuvring the second hardware component to a second position to be attached to the part, the second position determined by the robot based on the instructions provided to the robot.

According to some embodiments, the method further comprises attaching the second hardware component to the part by the robot.

According to some embodiments, the method further comprises, after attaching the second hardware component to the part by the robot, selecting a third hardware component to attach to the part.

According to some embodiments, selecting the third hardware component to attach to the part by the robot includes selecting an adjustable shelf bracket to attach to the part by the robot.

According to some embodiments, selecting the adjustable shelf bracket to attach to the part by the robot includes manoeuvring the multi-functional robotic head of the robot to a third storage location and gripping the adjustable shelf bracket by a third gripper of the multi-functional robotic head of the robot.

According to some embodiments, the method further comprises manoeuvring the third hardware component to a third position to be attached to the part, the third position determined by the robot based on the instructions provided to the robot.

According to some embodiments, the method further comprises attaching the third hardware component to the part by the robot.

According to some embodiments, attaching the first hardware component to the part by the robot includes attaching the first hardware component to the part by an attachment mechanism of the multi-functional robotic head of the robot.

According to some embodiments, attaching the first hardware component to the part by the attachment mechanism of the multi-functional robotic head of the robot includes selecting a fastener by the robot, the fastener stored in a storage depository of the robot, and attaching the first hardware component to the part via the fastener.

According to some embodiments, attaching the second hardware component to the part by the robot includes attaching the second hardware component to the part by an attachment mechanism of the multi-functional robotic head of the robot.

According to some embodiments, attaching the second hardware component to the part by the attachment mechanism of the multi-functional robotic head of the robot includes selecting a fastener by the robot, the fastener stored in a storage depository of the robot, and attaching the second hardware component to the part via the fastener.

According to some embodiments, attaching the third hardware component to the part by the robot includes attaching the third hardware component to the part by the attachment mechanism of the multi-functional robotic head of the robot.

According to some embodiments, attaching the third hardware component to the part by the attachment mechanism of the multi-functional robotic head of the robot includes selecting a fastener by the robot, the fastener stored in a storage depository of the robot, and attaching the third hardware component to the part via the fastener.

Figure 1:
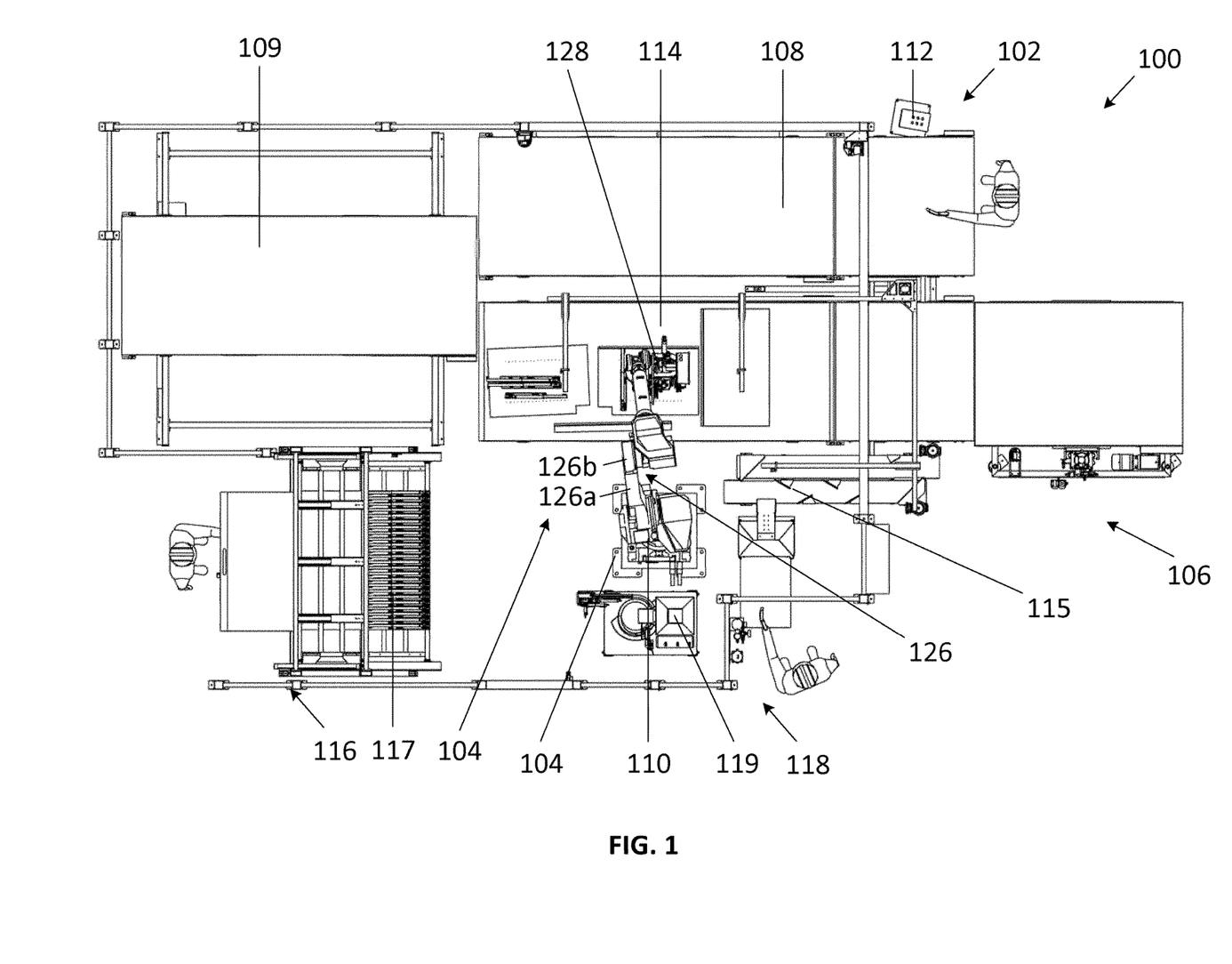
FIG. 1 is a top down view of a system for assembling furniture, according to one embodiment.

Referring now to FIG. 1, shown therein is a system 100 for assembling furniture. System 100 includes a loading area 102, a robot area 104 and an unloading area 106.

In some embodiments, one or more parts to be assembled into a piece of furniture are generally loaded onto an infeed conveyor belt 108 in the loading area 102 and carried by the conveyor belt 108 to the robot area 104 by a transfer conveyor 109 to be acted on by the robot 110. An operator may be present in the loading area 102 (e.g. near a control panel 112) and may use control panel 112 to control the infeed conveyor belt 108 and/or the transfer conveyor belt 109 and/or other physical components of the system 100 described below.

It should be noted herein that the term "assemble" or "assembled" refers to fitting together separate component parts into a single article. "Assemble" or "assembled" should not be interpreted to mean that after fitting together the separate component parts into a single article, the single article is completed. Rather, the single article may be forwarded to another system or process that continues assembly of additional component parts to the single article. For instance, in embodiments where the assembly of one or more parts into a piece of furniture is described, it should not be interpreted that when the piece of furniture exits the system 100, that assembly of the piece of furniture is completed.

In some embodiments, the operator may input a signal (e.g. via a button) into the control panel 112 to indicate that loading the parts onto the infeed conveyor belt 108 is complete. Once the signal is received, the system 100 confirms that the transfer conveyor 109 is appropriately positioned to receive the parts from the infeed conveyor 108 and activates the conveyors 108, 109. Once the parts are transferred from the infeed conveyor 108 to the transfer conveyor 109, the transfer conveyor 109 may slide horizontally to align with a robot system conveyor 114 and transfer the parts to the robot system conveyor 114 to present the parts to the robot 110.

Robot area 104 includes robot 110. Robot 110 performs several operations on the parts presented to it on the robot system conveyor 114 to assemble furniture. For instance, these operations may include but are not limited to installation of drawer slides on the parts, installation of hinge mounting plates on the parts, application of glue into grooves and holes on the parts and installation of shelf brackets on the parts.

Robot area 104 may also include a hardware provider 115, a first storage area 116 and a second storage area 118. Hardware provider 115 is for providing hardware components (e.g. first hardware component) to be used by the robot 110 during operations while assembling furniture. In some embodiments, hardware provider 115 may include a vibratory bowl feeder for providing hardware components to the robot 110 to use in assembling furniture.

Robot 110 can access and/or retrieve hardware components stored in the first storage area 116 and a second storage area 118. In some embodiments, first storage area 116 includes at least a first storage device 117 for storing hardware components to be used by the robot 102 during operations while assembling furniture and second storage area 118 includes at least a second storage device 119 for storing hardware components to be used by the robot 102 during operations while assembling furniture. In some embodiments, these storage areas 116, 118 (and devices 117, 119) are restocked with hardware components by an operator or operators. This may be completed in interaction with the robot 110 to ensure safety of the operator(s).

It should be noted that there are several computing units that can be used in the system 100, including at least one computing unit for robot 110. These computing units can be implemented using micro-controllers, processors, video graphics chips, Application Specific Integrated Circuits or other hardware that can provide sufficient processing power for the particular tasks that are to be implemented. In some embodiments, the robot 110 and the first and/or second storage devices 117, 119 can utilize the same computing unit (e.g. computer).

In other embodiments, the robot 110 and the first and/or second storage devices 117, 119 can utilize separate computing units that are communicatively coupled to each other (e.g. over a network). For instance, in some embodiments, a computing unit of robot 110 can provide signals to first and/or second storage devices 117, 119 indicating that robot 110 will be retrieving a component from the first and/or second storage devices 117, 119. In response, first and/or second storage devices 117, 119 can provide for the robot 110 to select a component stored in the first and/or second storage devices 117, 119. For instance, in one specific embodiment, first storage device 117 may include drawers and first storage device can open a drawer containing a component for retrieval by the robot 110. In some embodiments, first and/or second storage devices 117, 119 may provide a location to the robot 110 for retrieval of a component stored therein.

Robot system conveyor 114 transfers parts that have been assembled by the robot 110 to unloading area 106 to be unloaded.

Referring now to FIGS. 2 to 7, illustrated therein is are various views of at least a portion of a robot 110, according to at least one embodiment. Robot 110 includes a base 124 (see FIG. 1), a robotic arm 126 (see FIG. 1), a multi-functional robotic head 128 and a computing unit (not shown).

Base 124 can be any appropriate base for supporting the robotic arm 126 and the multi-functional robotic head 128. The base 124 may be a stationary base or may be portable. For instance, in the example embodiment shown in FIG. 1, the base 124 is a structure having a top surface for mounting the robotic arm 126. The base 124 may also be configured to house electronic equipment associated with the robotic arm 126.

Robotic arm 126 is mounted to the base 124 and coupled to the multi-functional robotic head 128. In the embodiment shown in FIG. 1, robotic arm 126 includes a first linkage 126a and a second linkage 126b. First linkage 126a has a first end that is mounted to the base 124 and a second end that is coupled to the second linkage 126b. Second linkage 126b has a first end that is coupled to the first linkage 126a and a second end that is coupled to the multi-functional robotic head 128. First linkage 126a is rotationally mounted to base 124 such that the robotic arm 126 is rotatable about the base 124. For instance, the robotic arm 126 may be rotatable about an axis defined by the base 124 (e.g. a vertical axis passing through the base 124). Second linkage 126b is coupled to first linkage 126a such that second linkage 126b can rotate about an axis perpendicular to an axis defined by first linkage 106a.

Figure 2:
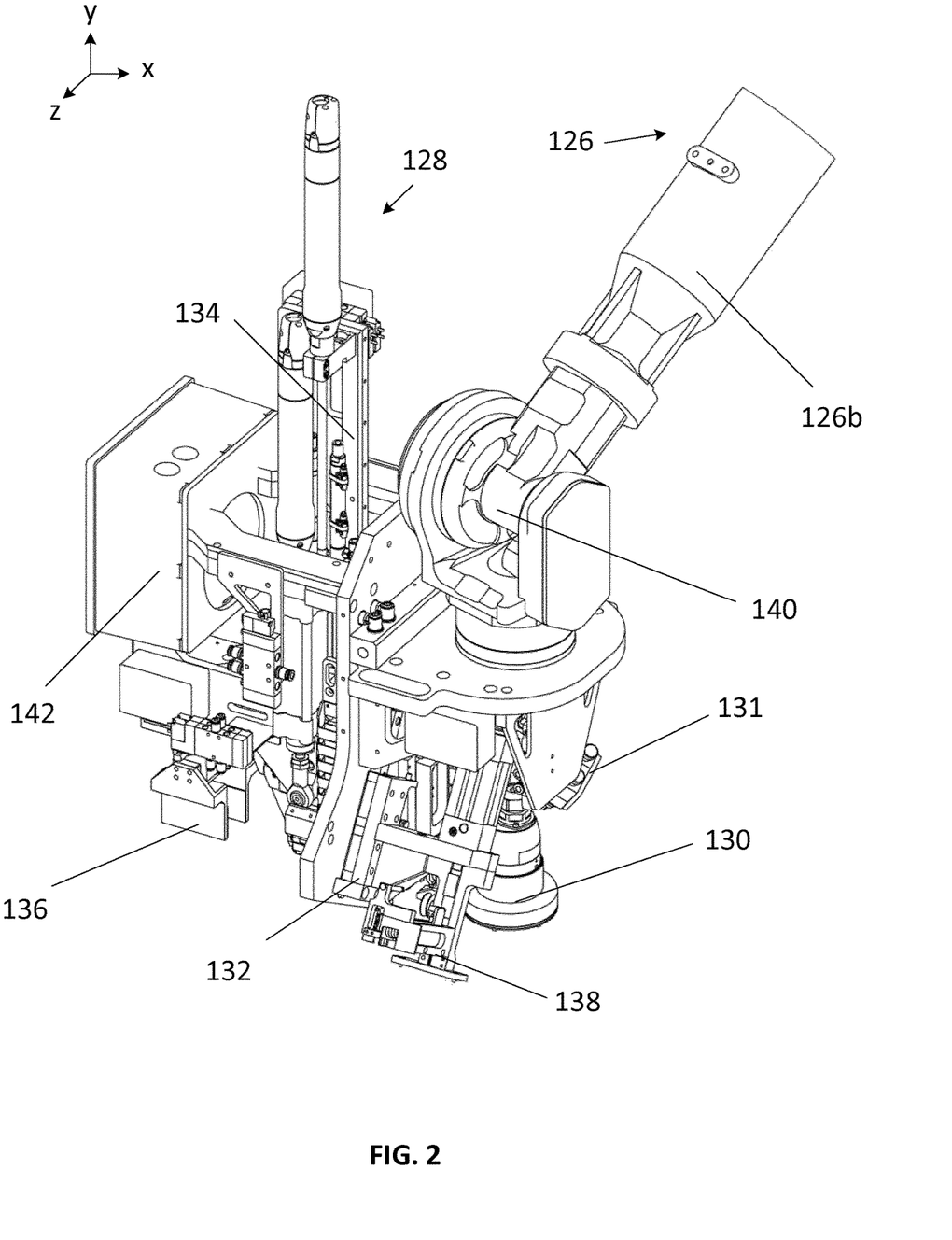
FIG. 2 is a front perspective view of a portion of a robot of the system for assembling furniture of FIG. 1 showing a multi-functional robotic head coupled to a robotic arm, according to one embodiment.

Referring now to FIG. 2, multi-functional robotic head 128 is coupled to the robotic arm 126 via a connector 140. The connector 140 provides for the multi-functional robotic head 128 to rotate about the robotic arm 126 in at least three axes. For instance, connector 140 provides for multi-functional robotic head 128 to rotate freely about x, y and z axes as defined by the robotic arm 126 (see FIG. 2).

Figure 3:
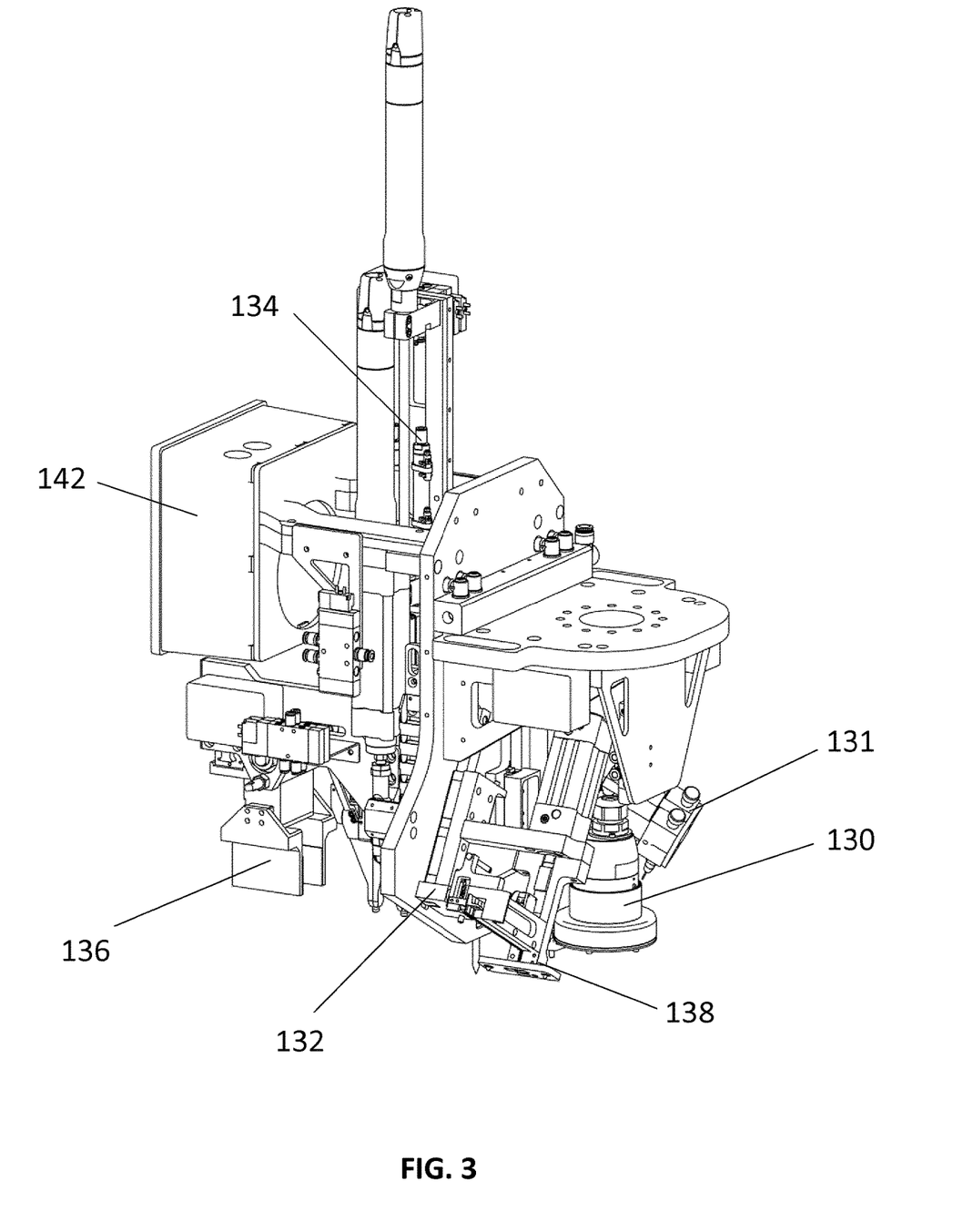
FIG. 3 is a front perspective view of the multi-functional robotic head of the robot of the system for assembling furniture of FIG. 1.
Figure 4:
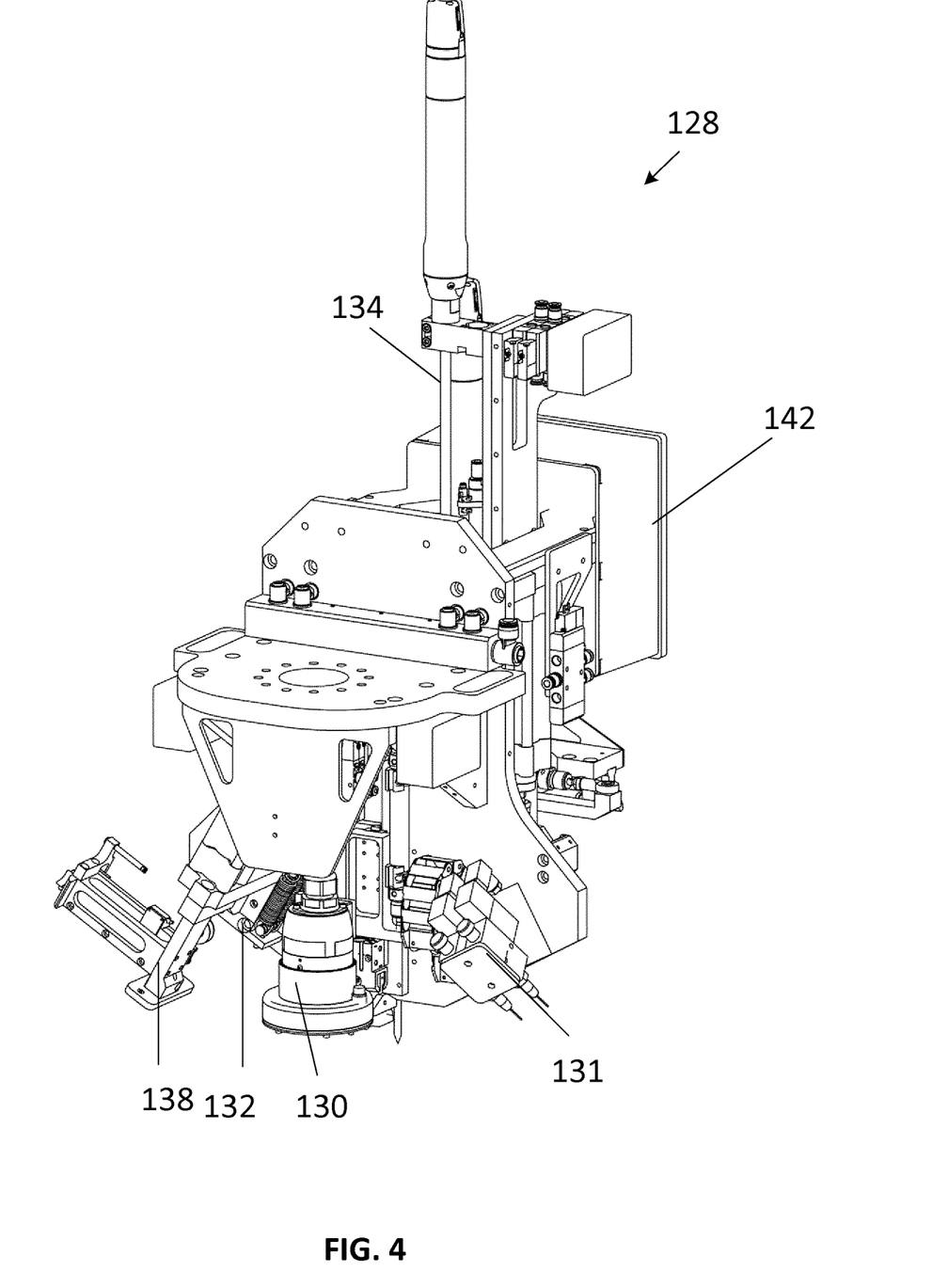
FIG. 4 is a side perspective view of the multi-functional robotic head of the robot of the system for assembling furniture of FIG. 1.
Figure 5:
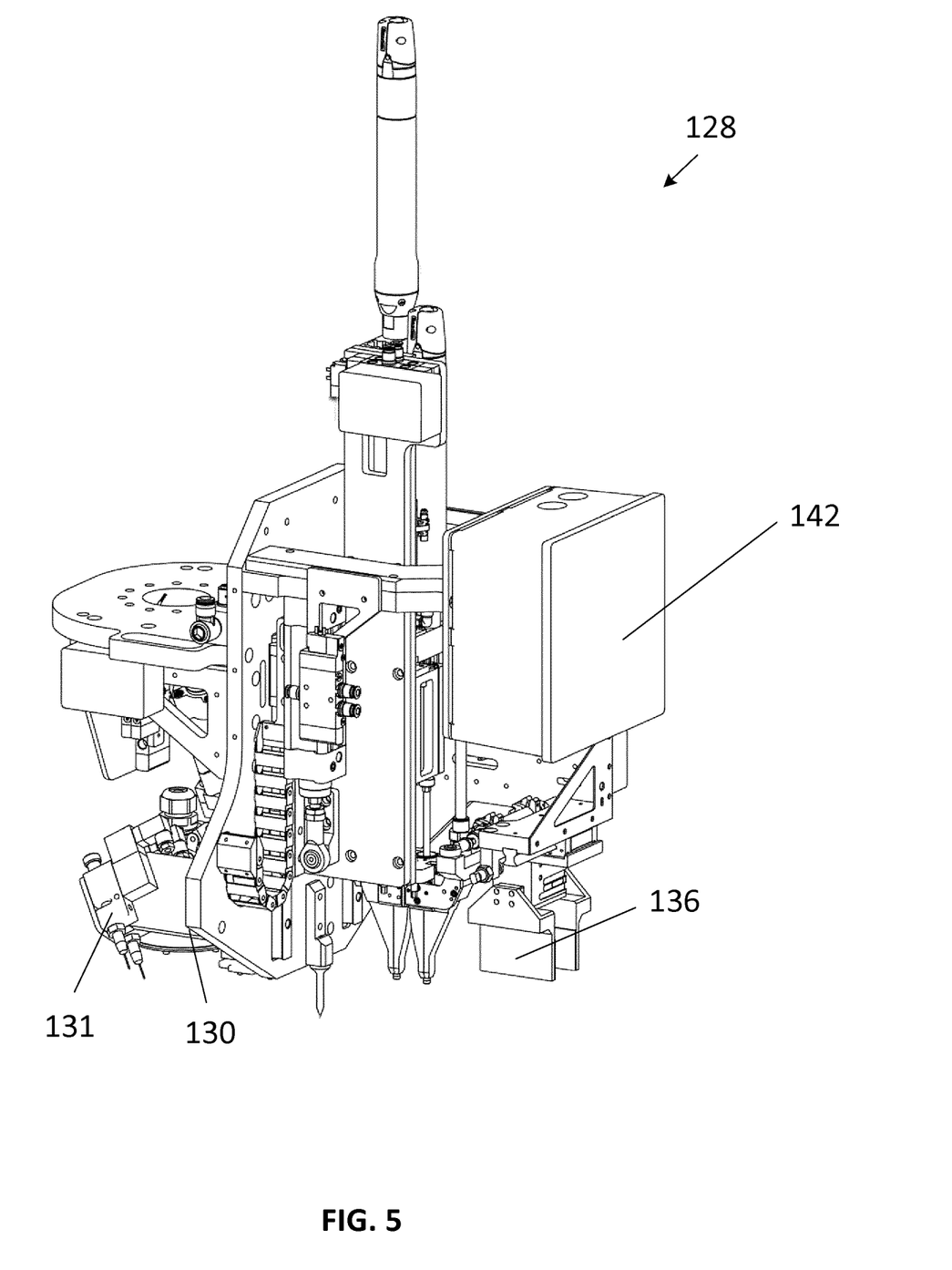
FIG. 5 is a rear perspective view of the multi-functional robotic head of the robot of the system for assembling furniture of FIG. 1.

Turning to FIGS. 3 to 5, multi-functional robotic head 128 includes at least a camera 130, a first applicator mechanism 131, a first gripping mechanism 132, a first attachment mechanism 134, a second gripping mechanism 136 and a second applicator mechanism 138.

Camera 130 can be any imaging device capable of scanning a barcode. For instance, camera 130 can be any electronic device that can read and output printed barcodes to a computing unit (not shown) In some embodiments, the computing unit can be housed in a programmable logic controlled separate from the robot 110. Camera 130 generally comprises of a light source, a lens and a light sensor translating optical impulses into electrical pulses. Camera 130 may include decoder circuitry for analyzing the barcode's image data provided by the sensor and sending the barcode's content to an output port. Camera 130 is generally positioned on a periphery of the multi-functional robotic head 128.

In some embodiments, the barcode includes a URL that the computing unit can use to retrieve the instructions. In other embodiments, the instructions can be stored on the computing unit and the barcode and indicate to the robot what instructions to perform.

In some embodiments, camera 130 may also be configured to scan at least one surface of the part presented to the robot 110 to determine dimensions of the part. For instance, camera 130 may be able to capture an image of one or more parts presented to the robot 110 to determine dimensions of the part(s). The image captured by the camera 130 can be transferred to the computing unit for processing to determine the dimensions (e.g. width and/or length) of the part(s). The image captured by the camera 130 may also be used to determine an orientation of the part(s) on the transfer conveyor belt 109. In some embodiments, the computing unit may include programming providing the robot 110 with dimensions of the part(s) and the camera 130 can be configured to capture an image of part(s) and to transfer the image or images to the computing unit to confirm the dimensions and/or orientation of the part(s).

In other embodiments, the camera 130 can capture an image or one or more portions of the part(s) to determine a position of the part relative to the robot 110. For instance, the computing unit may determine a position of the multi-functional robotic head 128 in relation to the robot 110. In some embodiments, the computing unit sends to the robot 110 a position and either an action to perform or a task to complete at the position. The robot 110 the controls the arm 126 and the multi-functional robotic head 128 to perform the action and/or complete the task.

First applicator mechanism 131 is configured to apply a compound to the part(s) presented to the robot 110. For instance, first applicator mechanism 131 may be configured to apply an adhesive (e.g. glue) to part(s) presented to the robot 110. First applicator mechanism 131 may be a mechanism supplied from Nordson and include a pump, pressure regulators, distributors and one or more injection nozzles. In some embodiments, first applicator mechanism 131 may be completely or partially affixed to the robot 110. For instance, in some embodiments, only the one or more injection nozzles and distributors of the first applicator mechanism 131 may be affixed to the multi-functional robotic head 110. In this case, the remaining components of the first applicator mechanism 131 may be positioned adjacent to the robot 110 within the system 100.

In some embodiments, robot 110 may be configured to apply adhesive to insertion grooves on a back surface of the part(s) presented to the robot 110 on transfer conveyor belt 109. In some embodiments, the robot 110 may be configured to apply adhesive to holes in the part(s) that will accommodate a dowel or another part to be assembled into furniture.

First gripping mechanism 132 is configured to grip a first hardware component (not shown) for assembling with the part(s) presented to the robot 110. In some embodiments, first gripping mechanism 132 may be referred to as a parallel gripper with adapted jaws for gripping the first hardware component. In some embodiments, the first hardware component may be a hinge mounting plate.

Robot 110 is configured to manoeuver the robotic arm 126 and the multi-functional robotic head 128 such that the first gripping mechanism 132 can retrieve the first hardware component from hardware provider 115. Robot 110 is also configured to manoeuver the robotic arm 126 and the multi-functional robotic head 128 to provide the first hardware component to the part presented to the robot 110 at a first position of the part(s). Providing the hardware component to the first position of the part may include placing the first hardware component on the part at a position where the first hardware component is to be attached to the part. Co-ordinates of the first position are provided to the robot 110 by the instructions contained in the barcode and received by the computing unit when the robot 110 scans the barcode on the part(s).

First attachment mechanism 134 is configured to attach at least the first hardware component to the part(s) at the first position of the part. For instance, the first attachment mechanism 134 may include a screwdriver that attaches the first hardware component to the part presented to the robot 110. In some embodiments, the robot 110 can manoeuvre the robotic arm 126 and the multi-functional robotic head 128 to provide for the first gripping mechanism 132 to place the first hardware component on the part at the first position. The robot 110 can then reorient the multi-functional robotic head 128 such that the first attachment mechanism 134 can deploy a fastener and attach the first hardware component to the part at the first position.

In some embodiments, the fastener is one of a screw, a nail, a dowel, a bolt or the like. In some embodiments, the fastener can be stored in a fastener storage region (not shown) of the multi-functional robotic head 128 or the first attachment mechanism 134. In some embodiments, the fastener can be retrieve from the fastener storage region by the first attachment mechanism 138 for use in attaching the first hardware component to the part.

In some embodiments, robot 110 includes a second gripping mechanism 136 configured to grip a second hardware component (not shown) for assembling with the part(s) presented to the robot 110. In some embodiments, second gripping mechanism 136 may be referred to as a parallel gripper with adapted jaws for gripping the second hardware component. In some embodiments, the second hardware component is a slide and a slide spacer.

Robot 110 is configured to manoeuver the robotic arm 126 and the multi-functional robotic head 128 such that the second gripping mechanism 136 can retrieve the second hardware component from a storage device (e.g. first storage device 117). For instance, the robotic arm 126 and the multi-functional robotic head 128 may be configured to maneuver the second gripping mechanism 136 to retrieve the second hardware component from a drawer of the storage device 117 that has been opened in response to the robot 110 transmitting a signal to the storage device 117 requesting that the robot 110 retrieve the second hardware component from the storage device 117. In some embodiments, in response to receiving the request for the second hardware component, the second storage device 117 may transmit a response to the robot 110 providing co-ordinates (i.e. location) of the second hardware component. In some embodiments, in response to receiving the request for the second hardware component, the second storage device 117 may transmit a response to the robot 110 indicating that it is not currently storing the second hardware component.

Once multi-functional robotic head 128 has retrieved the second hardware component, the robot 110 is also configured to manoeuver the robotic arm 126 and the multi-functional robotic head 128 to provide the second hardware component to the part presented to the robot 110 at a second position of the part(s). Providing the second hardware component to the second position of the part may include placing the second hardware component on the part at a position of the part where the second hardware component is to be attached to the part. Co-ordinates of the second position are provided to the robot 110 by the instructions contained in the barcode and received by the computing unit when the robot 110 scans the barcode on the part(s).

First attachment mechanism 134 may also be configured to attach at least the second hardware component to the part(s) at the second position of the part. For instance, the first attachment mechanism 134 may include a screwdriver that can attach the second hardware component to the part presented to the robot 110. In some embodiments, the robot 110 can manoeuvre the robotic arm 126 and the multi-functional robotic head 128 to provide for the second gripping mechanism 136 to place the second hardware component on the part at the second position. The robot 110 can then reorient the multi-functional robotic head 128 such that the first attachment mechanism 134 can deploy a fastener and attach the second hardware component to the part at the second position.

In some embodiments, robot 110 includes a second applicator mechanism 138 configured to apply a third hardware component to the part(s) presented to the robot 110. In some embodiments, second applicator mechanism 138 may be include a parallel gripper with adapted jaws for gripping the third hardware component. In some embodiments, the third hardware component may be an adjustable shelf bracket or a shelf support.

Figure 6:
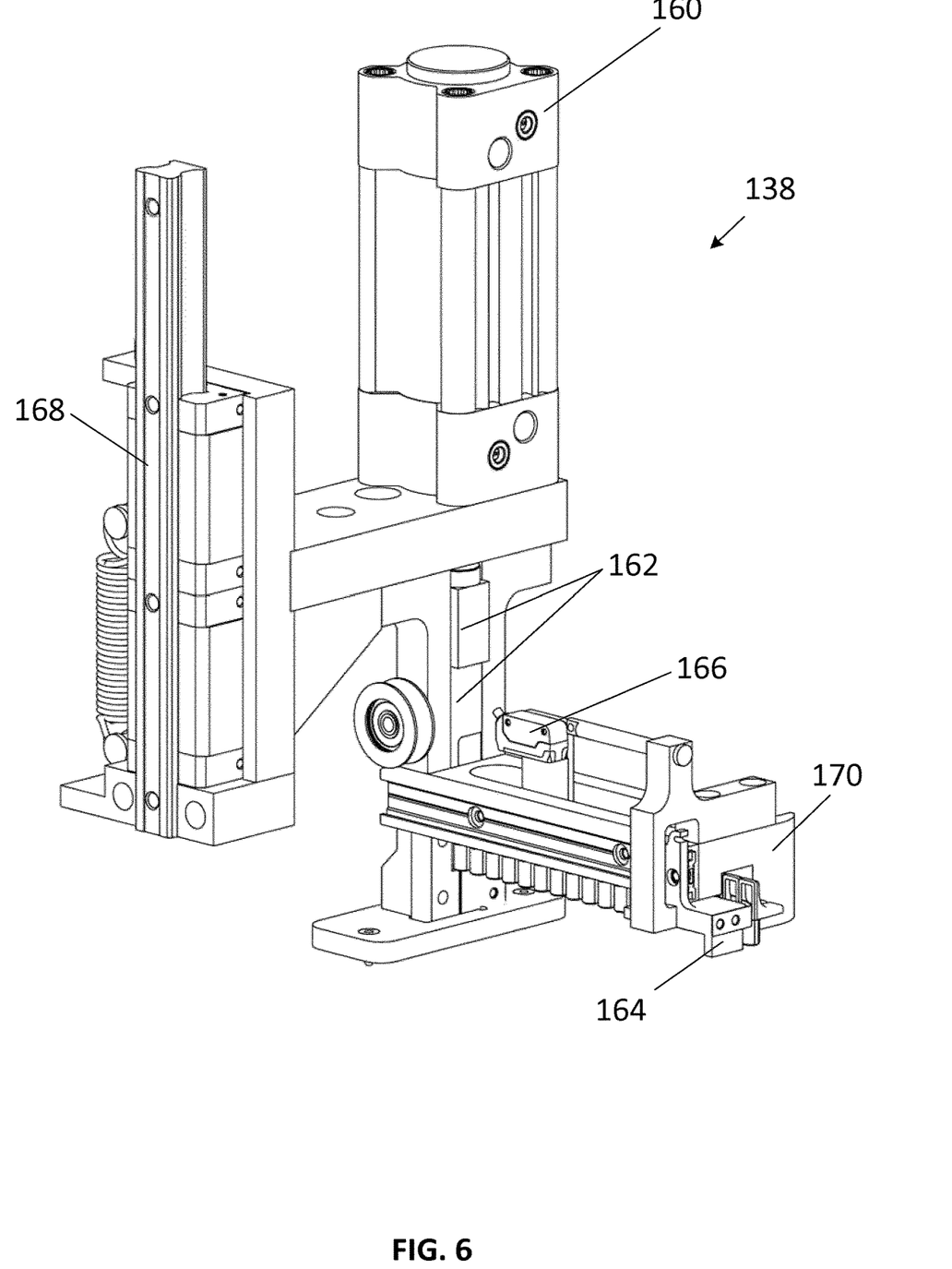
FIG. 6 is a front perspective view of a second applicator mechanism of the multi-functional robotic head of FIGS. 2 to 5, according to one embodiment.

Referring now to FIG. 6, illustrated therein is a perspective view of second applicator mechanism 138 according to one embodiment. In the embodiment shown in FIG. 6, second applicator mechanism 138 includes a pneumatic applicator cylinder 160 to provide energy to apply a third hardware component to the part. For instance, the third hardware component may be a shelf support or a shelf bracket and the pneumatic cylinder can provide a force to push the shelf support or shelf bracket into an opening in the part. Punch applicator 162 is in contact with the third hardware component to push the third hardware component into the part.

In the embodiment shown in FIG. 6, second applicator mechanism 138 also includes a change voltage regulator 164 that provides a third hardware component loaded into a charger 170 towards the punch applicator, a level sensor 166 to provide feedback to the robot 110 when the charger 170 is empty, a floating fastening system 168 to detect a position of the second applicator mechanism 138 and to provide to the robot 110 when the second applicator mechanism 138 is in a wrong position to protect the second applicator mechanism 138. Charger 170 may hold the third hardware component prior to the third hardware component being applied to the part.

Figure 7:
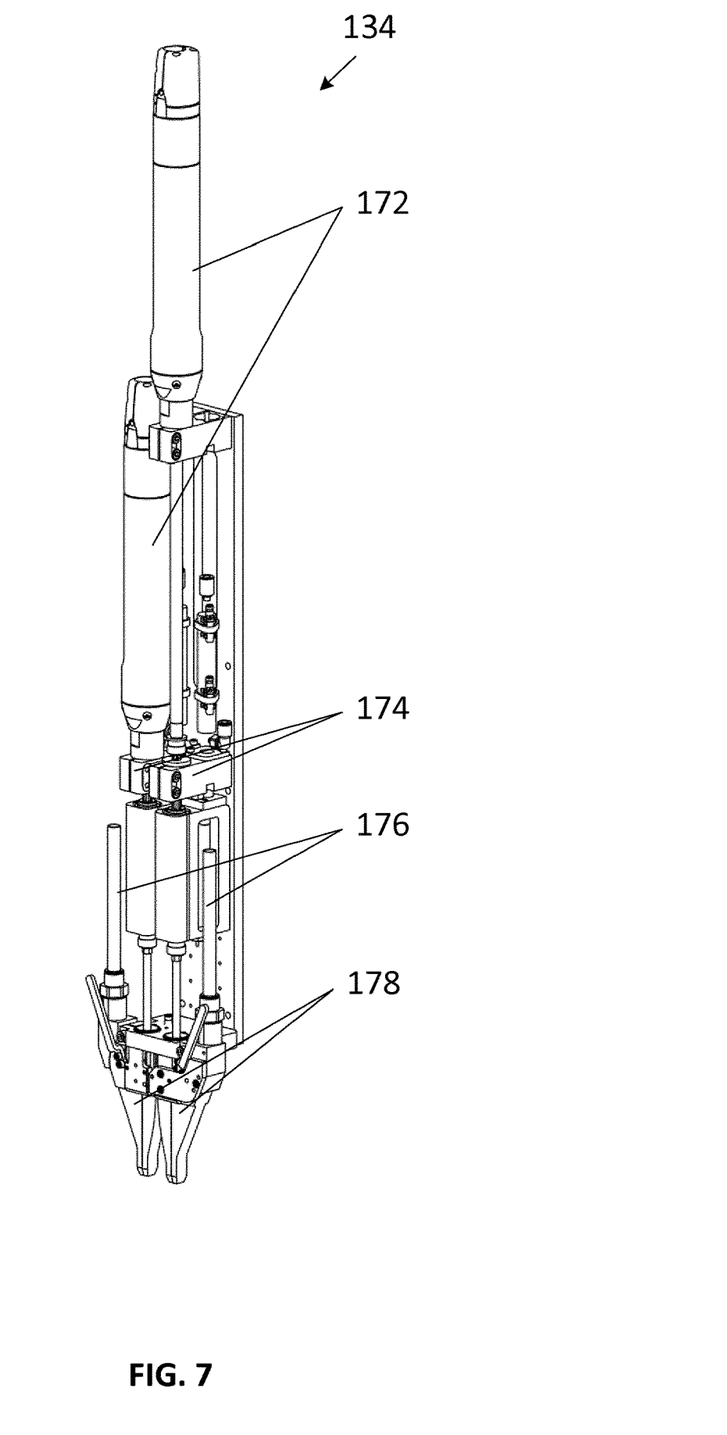
FIG. 7 is a front perspective view of a first attachment mechanism of the multi-functional robotic head of FIGS. 2 to 5, according to one embodiment.

Referring to FIG. 7, illustrated therein is a perspective view of first attachment mechanism 134, according to one embodiment. FIG. 7 shows that first attachment mechanism 134 includes one or more electrical motors 172 for rotating bits (e.g. screwdriver bits) for attaching fasteners to the part. First attachment mechanism 134 may also include one or more guide bearings 174. On each side of guide bearings 174 is a hose 176 in which fasteners (e.g. screws) are presented at the bottom of a pair of jaws 178. Bits pass through the jaws 178 when fasteners are presented to be attached to the part. First attachment mechanism 134 may be vertically movable relative to the robotic head 128 to expose the jaws 178 to the part to attach a fastener to the part.

As noted above, the robot 110 may also include a computing unit. The computing unit is configured to control the robotic arm 126 and the multi-functional robotic head 128 via control panel 142 to scan a barcode present on the part presented to the robot 100 with the camera 130, receive the instructions from the camera 130, and control the robotic arm 126 and the multi-functional robotic head 128 to assemble the piece of furniture based on the instructions.

Figure 8:
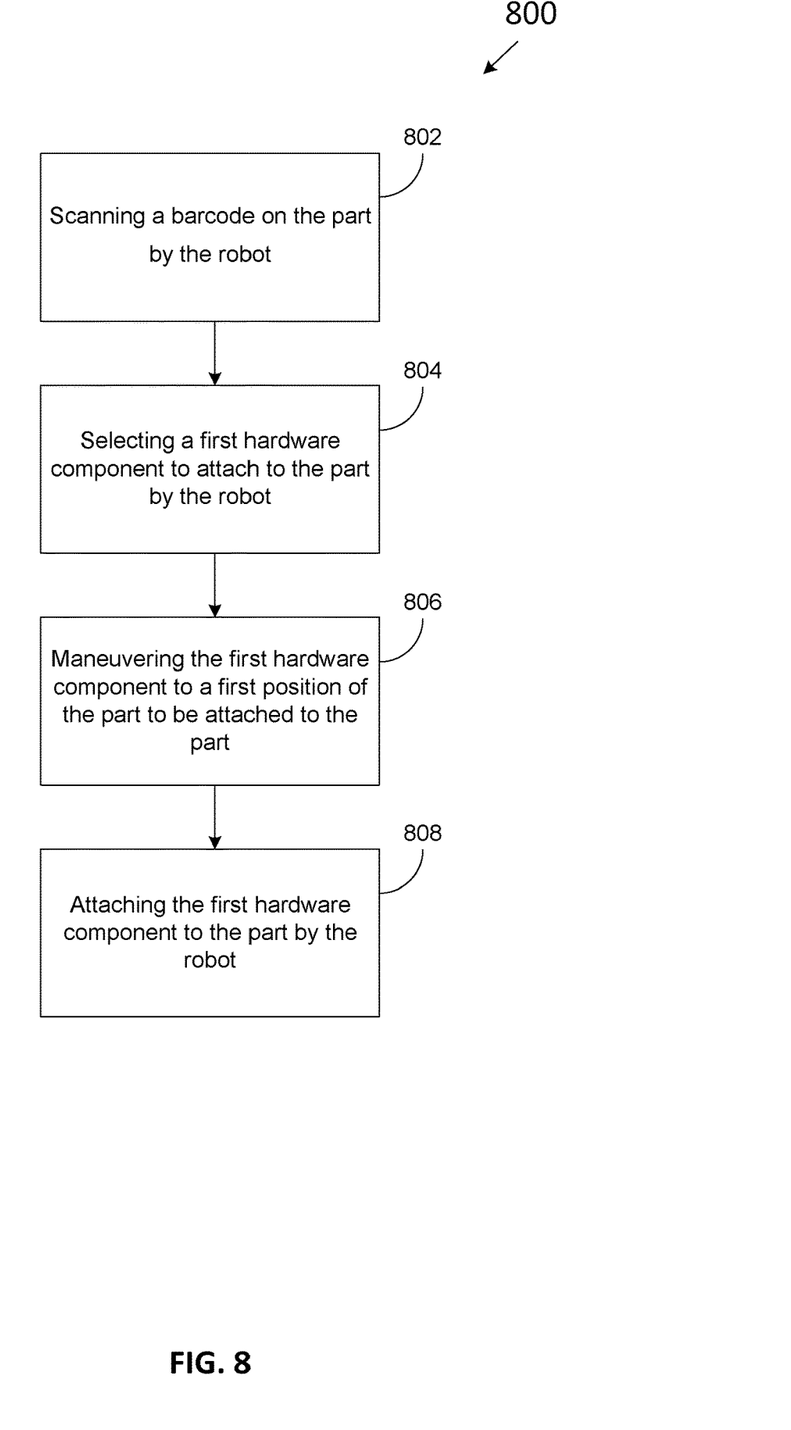
FIG. 8 is a block diagram of a method of assembling furniture according to one embodiment.

Referring now to FIG. 8, illustrated there is a block diagram of a method 700 of assembling furniture with a robot. Method 800 includes, at a step 802, scanning a barcode on the part by the robot. The barcode provides instructions to the robot for assembling the piece of furniture.

Method 800 also includes, at a step 804, selecting a first hardware component to attach to the part by the robot. The first hardware component is selected by the robot based on the instructions provided to the robot via the barcode.

Method 800 includes, at a step 806, maneuvering the first hardware component to a first position of the part to be attached to the part. The first position of the part is determined by the robot based on the instructions provided to the robot.

Method 800 includes, at a step 808, attaching the first hardware component to the part by the robot.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A robot for assembling a piece of furniture, the robot comprising:
   a base;
   a robotic arm coupled to the base at a first end of the robotic arm;
   a multi-functional robotic head coupled to the robotic arm at a second end of the robotic arm, the multi-functional robotic head comprising:
      a camera positioned on a periphery of the multi-functional robotic head, the camera being configured to:
         scan a barcode positioned on a part presented to the robot as the part rests on a conveyor, the barcode providing instructions for attaching one or more hardware components to the part to assemble the piece of furniture, the instructions including co-ordinates of a first position of the part for attaching a first hardware component; and
         capture an image of the part presented to the robot;
      a first applicator mechanism configured to apply an adhesive to the part;
      a first gripping mechanism configured to grip a first hardware component, the first hardware component being manoeuvred by the robotic arm to a first position to be attached to the part;
      a first attachment mechanism configured to attach the first hardware component to the part at the first position via a fastener to assemble the piece of furniture; and
   a computing unit in communication with the robotic arm and the multi-functional robotic head, the computing unit configured to:
      receive the instructions and the image of the part from the camera;
      process the instructions to determine the first hardware component to attach to the part;
      process the image to determine dimensions and an orientation of the part as the part rests on the conveyor;
      based on the dimensions, the orientation and the co-ordinates of the first position, locate the first position of the part to provide the first hardware component; and
      control the robotic arm the multi-functional robotic head to:
         place the first hardware component at the first position of the part with the first gripping mechanism; and
         while the first gripping mechanism holds the first hardware component at the first position of the part, attach the first hardware component to the part at the first position with the first attachment mechanism.

2. The robot of claim 1, wherein the processor is configured to determine a position on the part to apply the adhesive based on the instructions provided by the barcode.

3. The robot of claim 1, wherein the gripping mechanism is a pair of parallel plates.

4. The robot of claim 1, wherein the first hardware component is a hinge mounting plate.

5. The robot of claim 1, wherein the processor is further configured to direct the robotic arm to pick up the hinge mounting plates from a hardware provider.

6. The robot of claim 1, wherein the multi-functional robotic head further comprises a second gripping mechanism configured to grip a second hardware component.

7. The robot of claim 6, wherein the second hardware component is a slide and a slide spacer.

8. The robot of claim 1, wherein the multi-functional robotic head further comprises a second applicator mechanism configured to apply a third hardware component to the part.

9. A method of assembling a piece of furniture with a robot, the method comprising:
scanning a barcode on a part by a camera positioned on a periphery of a multi-functional robotic head of the robot, the barcode providing instructions for attaching one or more hardware components to the part to assemble the piece of furniture, the instructions including co-ordinates of a first position of the part for attaching a first hardware component;
capturing an image of the part presented to the robot by the camera positioned on the robotic head;
processing the instructions to determine a first hardware component to attach to the part;
processing the image to determine dimensions and an orientation of the part as the part rests on a conveyor;
based on the dimensions, the orientation and the co-ordinates of the first position, locating a first position of the part at which to place the first hardware component;
placing the first hardware component on the part at the co-ordinates of the first position; and
attaching the first hardware component to the part at the first position by a first attachment mechanism of the robot.

10. The method of claim 9, wherein selecting the first hardware component is a hinge mounting plate to attach to the part by the robot.

11. The method of claim 10, wherein placing the hinge mounting plate on the part includes manoeuvring a multi-functional robotic head of the robot to a first storage location and gripping the hinge mounting plate by a first gripper of the multi-functional robotic head of the robot.

12. The method of claim 11 further comprising selecting a second hardware component to attach to the part, the second hardware component including a slide and a slide spacer.

13. The method of claim 12, wherein selecting the slide and slide spacer to attach to the part by the robot includes manoeuvring a multi-functional robotic head of the robot to a second storage location and gripping the slide and a slide spacer by the second gripper of the multi-functional robotic head of the robot.

14. The method of claim 13, further comprising manoeuvring the second hardware component to a second position to be attached to the part, the second position determined by the robot based on the instructions provided to the robot.

15. The method of claim 14, further comprising attaching the second hardware component to the part by the robot.

16. The method of claim 15 further comprising, after attaching the second hardware component to the part by the robot, selecting a third hardware component to attach to the part.

17. The method of claim 16, wherein selecting the third hardware component to attach to the part by the robot includes selecting an adjustable shelf bracket to attach to the part by the robot.

* * * * *